(12) United States Patent
Meszlenyi

(10) Patent No.: US 8,036,002 B2
(45) Date of Patent: Oct. 11, 2011

(54) WIDE SUPPLY RANGE FLYBACK CONVERTER

(76) Inventor: Ivan Meszlenyi, Toronto (CA)

( * ) Notice: Subject to any disclaimer, the term of this patent is extended or adjusted under 35 U.S.C. 154(b) by 0 days.

(21) Appl. No.: 12/733,587

(22) PCT Filed: May 26, 2008

(86) PCT No.: PCT/CA2008/000990
§ 371 (c)(1),
(2), (4) Date: Mar. 10, 2010

(87) PCT Pub. No.: WO2008/144894
PCT Pub. Date: Dec. 4, 2008

(65) Prior Publication Data
US 2010/0226148 A1    Sep. 9, 2010

(30) Foreign Application Priority Data
May 31, 2007 (CA) .................................... 2591521

(51) Int. Cl.
*H02M 3/335*    (2006.01)

(52) U.S. Cl. .................................................. 363/21.12
(58) Field of Classification Search ...... 363/21.02–21.1, 363/21.12–21.17
See application file for complete search history.

(56) References Cited

U.S. PATENT DOCUMENTS

| | | | | |
|---|---|---|---|---|
| 4,847,742 A | * | 7/1989 | Ohashi et al. | 363/21.14 |
| 6,026,005 A | * | 2/2000 | Abdoulin | 363/89 |
| 6,940,733 B2 | * | 9/2005 | Schie et al. | 363/21.12 |
| 6,972,969 B1 | * | 12/2005 | Shteynberg et al. | 363/21.12 |
| 7,310,251 B2 | * | 12/2007 | Yang et al. | 363/56.09 |
| 7,710,745 B2 | * | 5/2010 | Weinstein et al. | 363/21.01 |

* cited by examiner

*Primary Examiner* — Adolf Berhane
*Assistant Examiner* — Jeffrey Gblende

(57) ABSTRACT

A wide supply range flyback converter consists of a Schmitt trigger driving a switching device such as MOSFET. The circuit employs a feed forward voltage controlled current source and two other voltage controlled current sources, one of which is responsible for minimizing on time and the other for increasing off time in order to achieve high efficiency, low standby power, and improved overload conditions.

18 Claims, 3 Drawing Sheets

WIDE SUPPLY RANGE FLYBACK CONVERTER

BACKGROUND OF THE INVENTION

1. Field of the Invention

The present invention generally relates to power converters. Specifically, the present invention relates to power converters operating in flyback mode and more specifically those that maintain high efficiency despite a wide range of line and load variations, have very low idle power consumption, and are low cost. Wherein, the ratio of high line to low line can be greater than 3 to 1.

2. Description of the Prior Art

Prior art embodiments customarily use DCM (Discontinuous Conduction Mode) operation for low power and CCM (Continuous Conduction Mode) operation for medium power conversion for wide range input AC to DC adapters. Employing purely CCM operation inherently produces high switching losses at high line whereas DCM operation for low power produces undesirably high conduction losses at low line input voltages. DCM operation allows for the minimization of the transformer size but increases conduction losses whereas CCM operation increases the transformer size requirement and switching losses.

SUMMARY OF THE INVENTION

The present invention exploits the advantages of flyback operation while not suffering from the disadvantages of this mode of operation which include its tendency toward reduced efficiency at high and low line conditions. It adapts to changes in line condition thereby reducing the drop in efficiency due to conductive losses at low line and switching losses at high line. Further, the present invention is practical for applications wherein reduced size, cost, and idle power consumption are desirable thus providing a superior alternative to the prior art.

DETAILED DESCRIPTION OF THE PREFERRED EMBODIMENT

Figure 1:
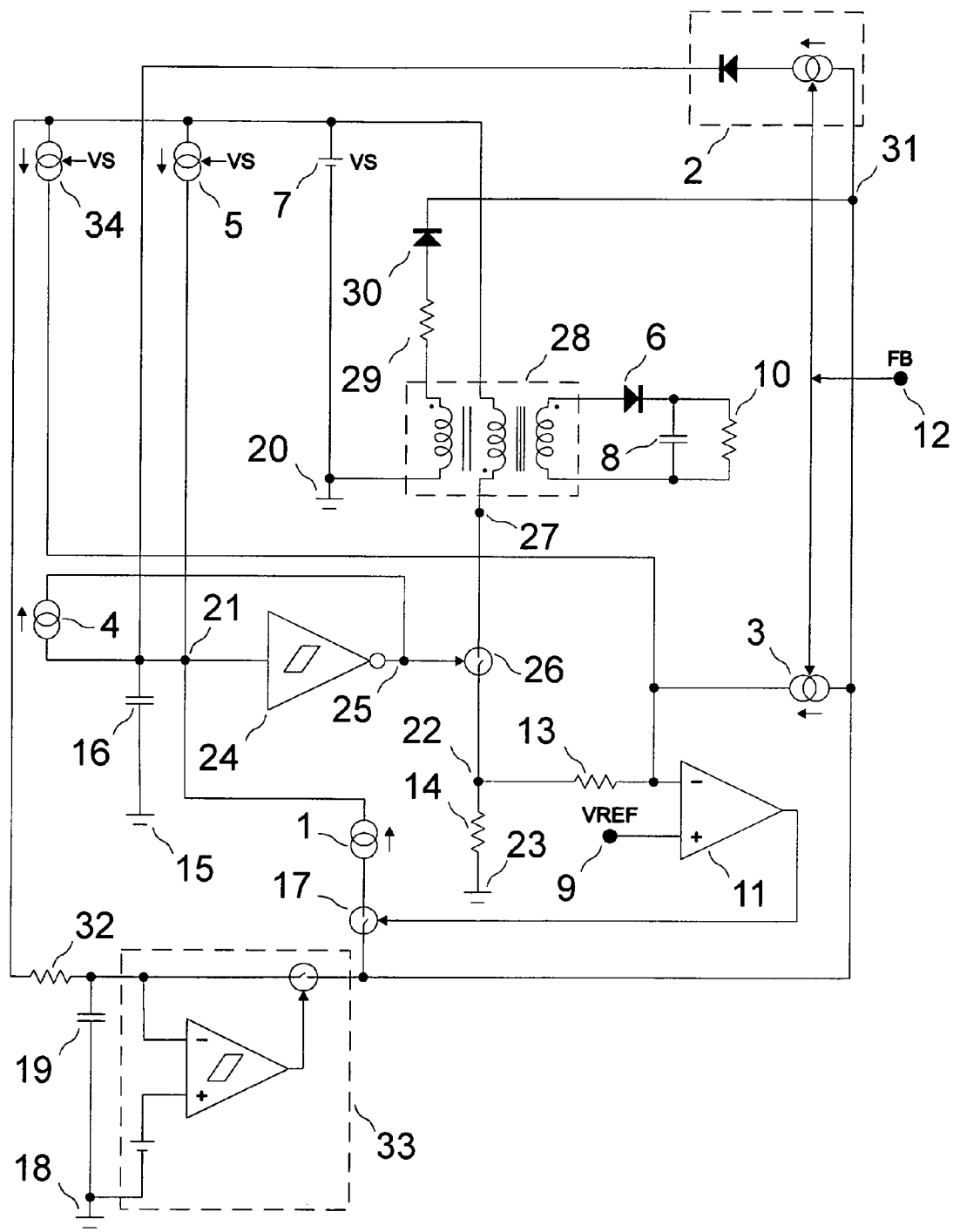
FIG. 1 is a schematic diagram of the preferred embodiment of the present invention.

In order to better understand the embodiment of the present invention, a wide supply range flyback converter will be described with reference to FIG. 1. One terminal of a timing capacitor 16 is connected to a voltage controlled current sink 4 as in FIG. 1 forming junction 21. Voltage controlled current source with gated threshold 2 and feed forward current source 5 are further connected to said junction point. Switched current source 1 is additionally connected to this junction. This junction also forms the input of inverted Schmitt trigger 24. A waveform as in FIG. 2B is developed at junction point 21. The other terminal of said timing capacitor 16 is connected to common ground 15. Ground points 15, 18, 20 and 23 represent a common point and are only separated for the purposes of this illustration.

The output of said inverted Schmitt trigger 24 is connected to the input terminal of a switching element 26, such as a MOSFET, and is additionally connected to the other terminal of voltage controlled current sink 4 forming junction point 25. A waveform as in FIG. 2C is developed at junction point 25. The first output terminal of switching element 26 is connected to the dotted terminal of the primary winding of transformer 28 forming junction point 27 where a waveform as in FIG. 2D is developed. In FIG. 2D, $V_{SPIKE}$ denotes the maximum voltage point across switching element 26 which will decay to the reflected voltage value, $V_{REFLECTED}$. Transformer 28 further comprises a secondary winding and a bias winding. The other terminal of said primary winding of transformer 28 is connected to the positive terminal of the converter's DC supply 7, a power source typically derived from rectified and filtered AC mains, the other terminal of said feed forward current source 5, a terminal of voltage controlled current source 34, and a terminal of startup resistor 32. The negative terminal of said DC supply 7 is connected to common ground 20.

The second output terminal of switching element 26 is connected to a terminal of sensing resistor 14 and the a terminal of a current sample feed resistor 13 forming junction point 22. A waveform as in FIG. 2A is developed at junction point 22. The remaining terminal of said current sample feed resistor 13 is connected to the negative input of current sense comparator 11, a terminal of voltage controlled current source 3, and the remaining terminal of voltage controlled current source 34. The remaining terminal of sensing resistor 14 is connected to common ground 23. The positive input of said current sense comparator 11 forms voltage reference point 9.

A terminal of the secondary winding of transformer 28 is connected to a terminal of output capacitor 8 and a terminal of load 10 forming the negative output of the converter. The dotted terminal of the secondary winding of transformer 28 is connected the anode of rectifier 6. The cathode of said rectifier 6 is connected to the remaining terminals of output capacitor 8 and load 10 forming the positive output of the converter.

The output of said current sense comparator 11 is connected to the input of switching element 17, typically a transistor. An output terminal of said switching element 17 is connected to the remaining terminal of switched current source 1. The other output terminal of switching element 17 is connected to the output terminal of a typical under-voltage lockout circuit with hysteresis 33, the other terminal of voltage controlled current source 3, the other terminal of voltage controlled current source with gated threshold 2, and the cathode of bias rectifier 30 forming junction point 31. The input terminal of said under-voltage lockout circuit with hysteresis 33 is connected to the remaining terminal of startup resistor 32 and a terminal of storage capacitor 19. The remaining terminal of said storage capacitor 19 and the ground terminal of said under-voltage lockout circuit with hysteresis 33 are connected to common ground 18.

Said voltage controlled current sources with gated threshold 2 and voltage controlled current source 3 are both controlled by the signal developed at feedback point 12. Feed forward current source 5 and voltage controlled current source 34 are controlled by DC supply 7.

The anode of said bias rectifier 30 is connected to a terminal of bias resistor 29. The other terminal of bias resistor 29 is connected to the dotted terminal of the bias winding of transformer 28. The other terminal of the bias winding of transformer 28 is connected to common ground 20.

Figure 2:
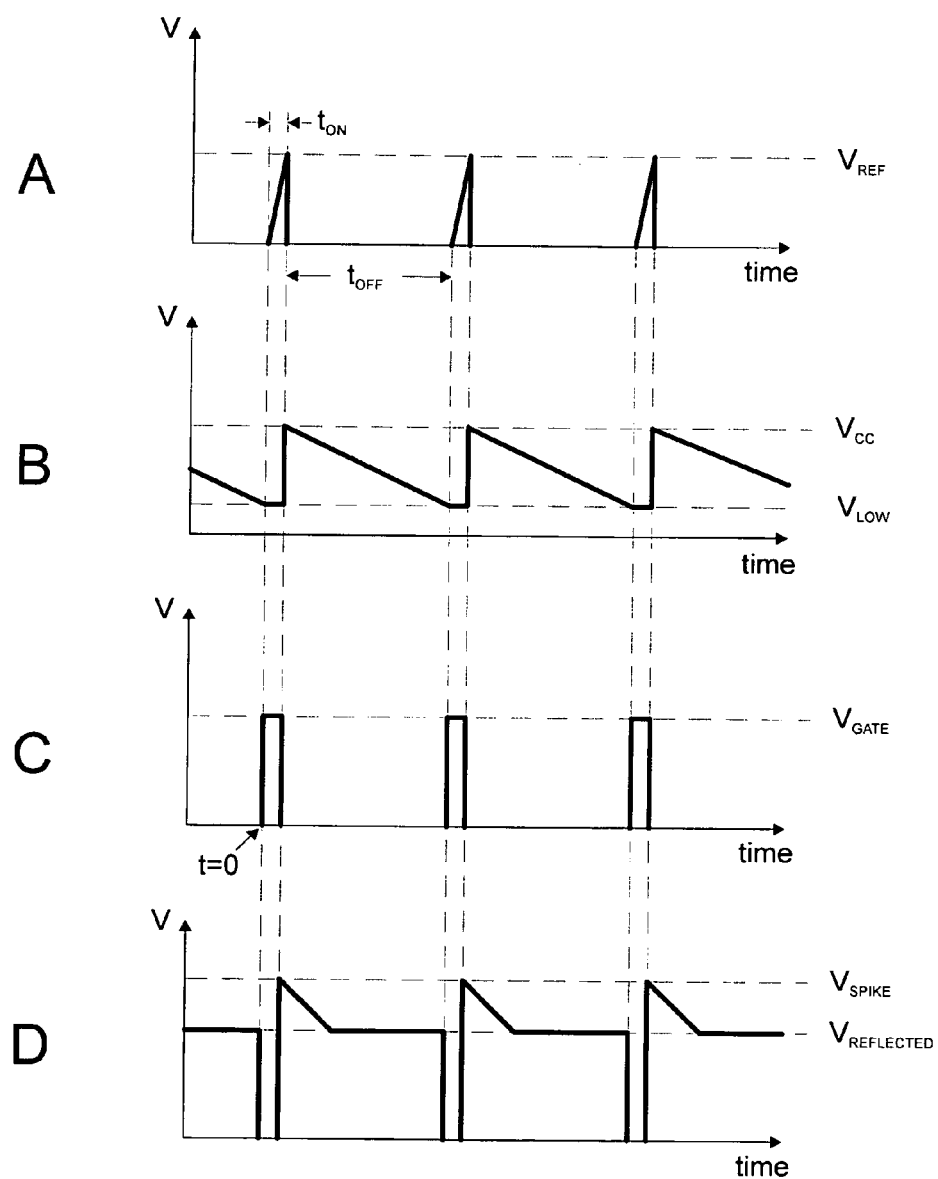
FIG. 2 is an illustration of voltage waveforms developed under operation at junction points as referenced in FIG. 1 essential to the understanding of the present invention.
Figure 3:
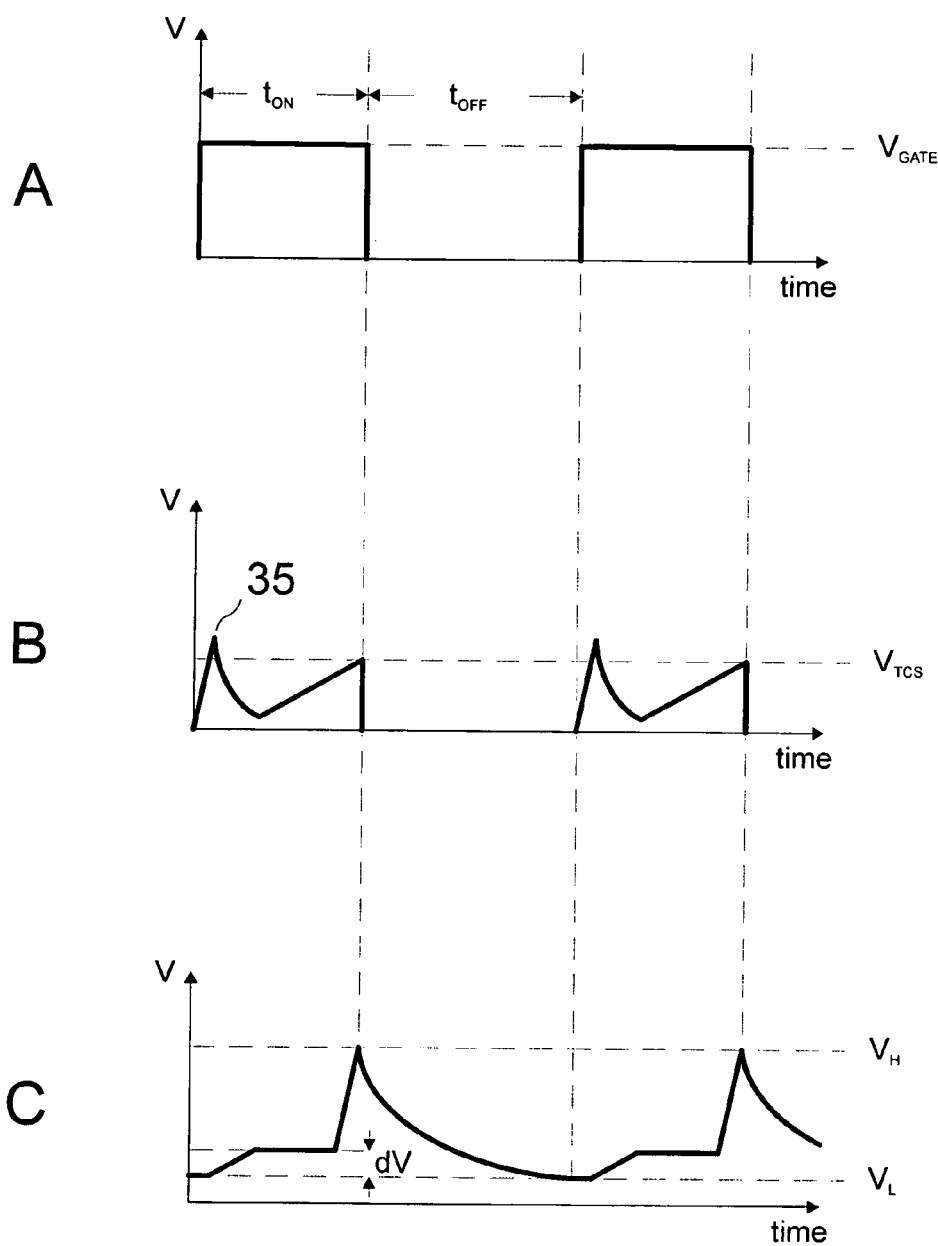
FIG. 3 is another illustration of voltage waveforms developed under operation at junction points as referenced in FIG. 1 essential to the understanding of the present invention.

In order to better understand the present invention, typical operation will be described with reference to the waveforms developed as shown in FIGS. 2 and 3. For the purposes of this explanation, t=0 will be defined as the moment when the voltage on timing capacitor 16 crosses the lower threshold, $V_L$, of inverted Schmitt trigger 24 thus turning switching element 26 on, wherein the control waveform at junction point 25, as shown in FIG. 2C, is produced and lasts for the duration of the on time. Said on time is defined as the time required for the current to ramp up to the current sense threshold as demonstrated by the voltage waveform arising at junction point 22, as shown in FIG. 2A, which is proportional to the current through current sense resistor 14. The proportionality factor is the resistance of current sense resistor 14. The voltage appearing at junction 22 is combined at the negative input of current sense comparator 11 with the feedback signal provided via voltage controlled current source 3 therein reducing the current sense threshold in response to a load reduction and an increase in the supply voltage sample. When this combination exceeds the value of the reference at voltage reference point 9, the current sense comparator turns switching element 17 on, thereby allowing switched current source 1 to rapidly charge timing capacitor 16 to above the upper threshold, $V_H$, of inverted Schmitt trigger 24. At this point, the on time of switching element 26 will be terminated and timing capacitor 16 will be discharged by the sum of the currents of voltage controlled current sink 4, voltage controlled current source with gated threshold 2, and feed forward current source 5 until the voltage reaches $V_L$ again thus initiating a new cycle.

Since the discharge value of voltage controlled current sink 4 is reduced by feed forward current source 5, proportional to DC supply 7 voltage, $V_S$, power supply rejection is greatly improved together with the overload condition when high line voltage is applied. This is achieved by increasing off time at a rate faster than on time is decreased due to the current slope increase through switching element 26 as per $$\frac{V}{L} = \frac{di}{dt}$$

where V is the voltage at DC supply 7 and L is the magnetic inductance of the primary winding of said transformer 28. The net effect will be a drop in frequency which in turn will decrease switching losses at high line and conduction losses at low line.

Since the sensed peak current through the magnetizing winding of transformer 28 varies with changes in supply voltage due to the turn off delay between junction 22 and junction 25, thereby resulting in increased sensed current error with increased supply voltage, voltage controlled current source 34 is used to compensate for this error. Thus, voltage controlled current source 34 can be designed to keep the peak of the sensed current relatively constant with respect to supply voltage variation.

The signal at feedback point 12 initially modifies (reduces) current sense threshold in response to a load current decrease and thereby reduces the on time. When said feedback signal reaches a predetermined level, voltage controlled current source with gated threshold 2 will be activated as well and a simultaneous on time reduction and off time increase will be achieved resulting in high light load efficiencies. Voltage controlled current source with gated threshold 2 is typically set to be activated when the signal at feedback point 12 exceeds the lower threshold, $V_L$, of inverted Schmitt trigger 24. The voltage waveform at junction 21 across timing capacitor 16 is shown in FIG. 2B and the typical voltage waveform at junction 27 is shown in FIG. 2D.

Another important feature of the operation of the present invention is the inherent noise filtration of the current waveform. The typical current waveform appearing at junction 22 is not nearly as ideal as that depicted in FIG. 2A. FIG. 3A shows the control waveform of switching element 26 and the non-ideal current response is shown in FIG. 3B wherein the leading edge of the current waveform contains a spike 35 due to the input capacitance of switching element 26. This current spike 35, which easily reaches above the current sense threshold, $V_{TCS}$, would reset the inverted Schmitt trigger 24 if this was not counteracted by the integrating effect of timing capacitor 16 and switched current source 1. The actual effect of the spike 35 of the waveform at junction 21, the input of inverted Schmitt trigger 24, is shown in FIG. 3C wherein a voltage increase of dV is not sufficient to trip said inverted Schmitt trigger 24 to the off condition. Therein, the integrator formed by timing capacitor 16 and switched current source 1 greatly reduces chances of false triggering. FIG. 3C further shows an off time discharge pattern typical to the implementation of a resistor in place of voltage controlled current sink 4.

Yet another feature of the operation of the present invention is related to the overload condition. Bias rectifier 30 can be chosen to have a limited but sufficiently large reverse recovery time such that bias rectifier 30 in conjunction with bias resistor 29 will be average responding. Therefore, under overload condition, the bias voltage at junction 31 can be made to collapse sufficiently with the output voltage across load 10 to disable the operation of the converter by means of typical under-voltage lockout circuitry 33.

Yet another feature of the operation of the present invention is related to the no load condition. Therein, a low frequency load hunting operation of the under-voltage lockout circuitry 33 will be invoked, one cycle of which will be described herein. In order to achieve low power consumption under no load condition, the above mentioned rectification scheme of the bias voltage, utilizing bias rectifier 30 and bias resistor 29, is chosen such that at loads approaching 1% of the nominal full load value, said bias voltage average will be sufficiently small to trip the lockout feature of said under-voltage lockout circuit with hysteresis 33 whereby the converter is disabled for the duration required for startup resistor 32 to charge storage capacitor 19 to the positive going threshold, $V_{H_{UVLO}}$, of under-voltage lockout circuitry 33 lasting several hundred milliseconds. When said positive going threshold has been reached, the converter turns on for a few milliseconds and in the absence of loads greater than 1% of the nominal full load value, the voltage on capacitor 19 will drop again below the level of the negative going threshold, $V_{L_{UVLO}}$, of under-voltage lockout circuitry 33 thereby initiating a new cycle.

Although the present invention has been described in relation to particular embodiments thereof, many other variations, modifications, and other uses will become apparent to those skilled in the art. Therefore, the present invention should be limited not by specific disclosures herein, but only by the appended claim.

I claim as my invention:

1. A wide supply range flyback converter comprising:
   (a) a storage capacitor having two terminals where one terminal is connected to a common ground of the circuit;
   (b) an under-voltage lockout circuit with hysteresis having an input, an output, and ground terminal where the ground terminal is connected to the common ground of the circuit;
   (c) the other terminal of said storage capacitor connected to the input terminal of a said under-voltage lockout circuit with hysteresis and a terminal of a startup resistor;
   (d) a output terminal of said under-voltage lockout circuit with hysteresis connected to one terminal of a first voltage controlled current source, one terminal of a voltage controlled current source with gated threshold, a cathode of a bias rectifier, and an output terminal of a first switching element;

(e) said first voltage controlled current source and voltage controlled current source with gated threshold controlled by a feedback signal of the circuit;

(f) the other terminal of said first voltage controlled current source connected to a negative input of a current sense comparator, a terminal of a second voltage controlled current source, and a terminal of a current sample feed resistor;

(g) a positive input of said current sense comparator forming a voltage reference point of the converter;

(h) the output of said current sense comparator connected to a input of said first switching element;

(i) the other output of said first switching element connected to a terminal of a switched current source;

(j) an other terminal of said switched current source connected to an input of an inverted Schmitt trigger, a terminal of a timing capacitor, a terminal of a voltage controlled current sink, a terminal of a feed forward current source, and a remaining terminal of said voltage controlled current source with gated threshold;

(k) the other terminal of said voltage controlled current sink connected to an output of said inverted Schmitt trigger and an input of a second switching element, such as a MOSFET;

(l) an output terminal of said second switching element connected to an other terminal of said current sample feed resistor and a terminal of a sensing resistor;

(m) the other terminal of said sensing resistor connected to common ground;

(n) an other output terminal of said second switching element connected to a dotted terminal of a primary winding of a transformer;

(o) said transformer comprised of primary, secondary, and bias windings;

(p) the other terminal of the primary winding of said transformer connected to a positive terminal of a DC supply, a remaining terminal of said second voltage controlled current source, a remaining terminal of said feed forward current source, and a remaining terminal of said startup resistor;

(q) said second voltage controlled current source and said feed forward current source controlled by said DC supply;

(r) a negative terminal of said DC supply connected to common ground;

(s) a dotted terminal of the bias winding of said transformer connected to a terminal of a bias resistor;

(t) an other terminal of said bias resistor connected to the anode of said bias rectifier;

(u) an other terminal of the bias winding of said transformer connected to common ground;

(v) an dotted terminal of the secondary winding of said transformer connected to the anode of an output rectifier;

(w) the cathode of said output rectifier connected to a terminal of an output capacitor and a terminal of a load forming a positive output of the converter;

(x) an other terminal of the secondary winding of said transformer connected to an other terminal of said output capacitor and an other terminal of said load forming a negative output of the converter.

2. A wide supply range flyback converter as in claim 1, wherein the off time of said converter is inversely proportional to the sum of the currents of said voltage controlled current sink, said feed forward current source, and said voltage controlled current source with gated threshold.

3. A wide supply range flyback converter as in claim 1, wherein the on time of the converter is defined as the time it takes the current to ramp up to a predetermined threshold where said time is directly proportional to said DC supply voltage and inversely proportional to the magnetizing inductance of the primary winding of said transformer.

4. A wide supply range flyback converter as in claim 1, wherein said first voltage controlled current source and voltage controlled current source with gated threshold are responsive to a common feedback signal.

5. A wide supply range flyback converter as in claim 1, wherein said first voltage controlled current source is used to modify the current sense threshold in response to a line and load variation.

6. A wide supply range flyback converter as in claim 5, wherein said first voltage controlled current source is a resistor.

7. A wide supply range flyback converter as in claim 1, wherein said voltage controlled current source with gated threshold will increase the off time when said feedback signal is above a predetermined threshold.

8. A wide supply range flyback converter as in claim 7, wherein said voltage controlled current source with gated threshold can be substituted with a resistor in series with a diode.

9. A wide supply range flyback converter as in claim 1, wherein said feed forward current source is responsive to said supply voltage in increasing the turn off time proportionally.

10. A wide supply range flyback converter as in claim 9, wherein said feed forward current source is a resistor.

11. A wide supply range flyback converter as in claim 1, wherein the bias rectification circuitry is average responding and therefore its voltage level is greatly varied by line and load variations.

12. A wide supply range flyback converter as in claim 1, wherein the bias rectification circuitry can be configured to activate said under-voltage lockout circuit with hysteresis under abnormal conditions such as overload.

13. A wide supply range flyback converter as in claim 1, wherein said under-voltage lockout circuit with hysteresis is used to disable the converter in the event of overload or under voltage condition.

14. A wide supply range flyback converter as in claim 1, wherein said switched current source is activated by said current sense comparator.

15. A wide supply range flyback converter as in claim 1, wherein the current value of said switched current source is chosen to be sufficiently low in order to provide a low pass filter in conjunction with said timing capacitor to reduce current noise from said current sense resistor.

16. A wide supply range flyback converter as in claim 1, wherein said second voltage controlled current source is responsive to variations in supply voltage.

17. A wide supply range flyback converter as in claim 16, wherein said second voltage controlled current source compensates for current sense error arising due to said variations in supply voltage, thereby keeping the sensed current peak of the circuit constant.

18. A wide supply range flyback converter as in claim 1, wherein said second voltage controlled current source is a resistor.

* * * * *